(12) United States Patent
DeFoor

(10) Patent No.: US 11,297,783 B2
(45) Date of Patent: Apr. 12, 2022

(54) GROWING SYSTEM

(71) Applicant: DeFoor Innovations, LLC, Menlo Park, CA (US)

(72) Inventor: Nathan Andrew DeFoor, Sautee, GA (US)

(73) Assignee: DEFOOR INNOVATIONS, LLC, Saute Naccoche, GA (US)

(*) Notice: Subject to any disclaimer, the term of this patent is extended or adjusted under 35 U.S.C. 154(b) by 218 days.

(21) Appl. No.: 16/283,723

(22) Filed: Feb. 22, 2019

(65) Prior Publication Data

US 2019/0261583 A1 Aug. 29, 2019

Related U.S. Application Data

(60) Provisional application No. 62/634,513, filed on Feb. 23, 2018.

(51) Int. Cl.
*A01G 24/46* (2018.01)
*A01G 2/10* (2018.01)
(Continued)

(52) U.S. Cl.
CPC ............ *A01G 24/46* (2018.02); *A01G 2/10* (2018.02); *A01G 2/30* (2018.02); *A01G 9/022* (2013.01);
(Continued)

(58) Field of Classification Search
CPC . A01G 24/46; A01G 2/10; A01G 2/30; A01G 31/06; Y10T 428/2419; Y10T 428/2473; Y10T 442/659
See application file for complete search history.

(56) References Cited

U.S. PATENT DOCUMENTS 3,316,673 A * 5/1967 Mason .................. A01G 25/06
47/1.01 F
4,075,785 A 2/1978 Jones
(Continued)

FOREIGN PATENT DOCUMENTS

WO 2017/144904 A1 8/2017

OTHER PUBLICATIONS

Dreschel et al., "Demonstration of a Porous Tube Hydroponic System to Control Plant Moisture and Growth", NASA Technical Memorandum 2004-211533, Oct. 2003.
(Continued)

*Primary Examiner* — Magdalena Topolski
*Assistant Examiner* — William L Gmoser
(74) *Attorney, Agent, or Firm* — Rimon Law, P.C.

(57) ABSTRACT

Growing systems including double-walled growing devices, and methods of making and using the same are provided. Growing devices include two sheets of material, a sprouting layer and a rooting layer, strategically bonded together to form containers for growing plants. Each container includes openings in the layers to allow the plants to grow out of their containers and to allow roots to access water through the rooting layer. The two layers can be formed into a cylinder where the center of the cylinder provides a channel for watering such that the roots grow into that channel. Deployed as a flat sheet of containers, the device can include a third layer to provide a water channel between the rooting layer and the third layer. Growing systems include the device and can also include a system to provide water thereto, and an enclosure around the device for providing an overpressure.

19 Claims, 11 Drawing Sheets

(51) Int. Cl.
  *A01G 2/30* (2018.01)
  *A01G 24/50* (2018.01)
  *A01G 9/02* (2018.01)
  *B32B 5/02* (2006.01)
  *A01G 31/06* (2006.01)
  *A47G 7/04* (2006.01)

(52) U.S. Cl.
  CPC .............. *A01G 24/50* (2018.02); *A01G 31/06* (2013.01); *A47G 7/044* (2013.01); *A01G 9/024* (2013.01); *A01G 9/025* (2013.01); *B32B 5/02* (2013.01); *B32B 2307/7265* (2013.01); *B32B 2410/00* (2013.01)

(56) References Cited

U.S. PATENT DOCUMENTS

| | | | |
|---|---|---|---|
| 4,142,324 A | 3/1979 | Magyar, Jr. | |
| D251,718 S | 5/1979 | Hart | |
| 4,392,328 A | 7/1983 | Walker | |
| 4,454,684 A * | 6/1984 | O'Hare | A01G 31/06 47/82 |
| D278,614 S | 4/1985 | Moss | |
| 4,704,818 A | 11/1987 | Cameron | |
| 4,729,188 A | 3/1988 | Cheng | |
| 4,910,911 A * | 3/1990 | Ahm | A01G 9/0295 47/56 |
| D328,574 S | 8/1992 | Perkins et al. | |
| 5,168,664 A | 8/1992 | Deutschmann, Sr. | |
| 5,201,141 A | 4/1993 | Ahm | |
| 5,241,783 A * | 9/1993 | Krueger | A01G 9/026 47/65.8 |
| 5,385,590 A | 1/1995 | Sledge | |
| 5,401,281 A | 3/1995 | Chamoulaud | |
| 5,464,456 A * | 11/1995 | Kertz | A01G 7/04 47/1.3 |
| 5,715,629 A | 2/1998 | Hawkins | |
| 5,761,847 A * | 6/1998 | Ito | A01G 31/02 47/65.8 |
| 5,862,628 A | 1/1999 | Takashima | |
| 5,870,854 A * | 2/1999 | Wilkins | A01G 24/00 47/58.1 R |
| 6,173,529 B1 | 1/2001 | Kertz | |
| 6,314,678 B1 | 11/2001 | Akai | |
| 6,727,091 B2 | 4/2004 | Darlington | |
| 7,055,282 B2 | 6/2006 | Bryan, III | |
| 7,093,978 B2 | 8/2006 | Tan | |
| D658,537 S | 5/2012 | Simmons | |
| 8,484,890 B2 | 7/2013 | Simmons | |
| 8,516,743 B1 | 8/2013 | Giacomantonio | |
| 8,528,250 B2 | 9/2013 | Nelson et al. | |
| 8,567,122 B2 | 10/2013 | Nelson | |
| 8,756,860 B1 | 6/2014 | Murphy | |
| 8,776,433 B2 | 7/2014 | Huang et al. | |
| 9,220,207 B2 | 12/2015 | Storey | |
| 2002/0018875 A1 * | 2/2002 | Weder | B44C 5/06 428/141 |
| 2006/0053691 A1 * | 3/2006 | Harwood | A01G 31/042 47/62 A |
| 2009/0158653 A1 | 6/2009 | Oliver et al. | |
| 2009/0288341 A1 | 11/2009 | Kania et al. | |
| 2010/0221806 A1 | 9/2010 | Lieberman et al. | |
| 2011/0005130 A1 * | 1/2011 | Huang | A01G 24/46 47/65.7 |
| 2012/0005958 A1 | 1/2012 | Laitsch | |
| 2012/0222352 A1 | 9/2012 | Janssen | |
| 2013/0263502 A1 * | 10/2013 | O'Shea | B01J 20/24 47/48.5 |
| 2013/0340334 A1 * | 12/2013 | Huang | A01C 1/044 47/65.7 |
| 2014/0075841 A1 | 3/2014 | Degraff | |
| 2014/0137471 A1 | 5/2014 | Harwood et al. | |
| 2015/0040477 A1 | 2/2015 | Wang et al. | |
| 2015/0223418 A1 | 8/2015 | Collins et al. | |
| 2015/0264868 A1 | 9/2015 | Smiles | |
| 2015/0296724 A1 | 10/2015 | Martinez Ruanova | |
| 2015/0373935 A1 | 12/2015 | Anderson et al. | |
| 2016/0029581 A1 | 2/2016 | Martin et al. | |
| 2016/0037739 A1 | 2/2016 | Fankuchen et al. | |
| 2016/0135393 A1 | 5/2016 | Martinez Ruanova | |
| 2016/0135394 A1 | 5/2016 | Wagner | |
| 2016/0143234 A1 * | 5/2016 | Nasu | A01G 31/02 47/62 N |
| 2016/0143235 A1 | 5/2016 | Torres et al. | |

OTHER PUBLICATIONS

PCT/US2019/019324, International Search Report and Written Opinion dated May 14, 2019.

\* cited by examiner

GROWING SYSTEM

CROSS-REFERENCE TO RELATED APPLICATIONS

This application claims priority to U.S. Provisional Patent Application No. 62/634,513 entitled "Growing System" and filed on Feb. 23, 2018, which is incorporated herein by reference.

BACKGROUND OF THE INVENTION

Field of the Invention

The invention is in the field of horticulture, and more specifically related to hydroculture.

Related Art

Hydroculture includes methods of growing plants without soil, using mineral nutrient solutions in a water solvent. Although soils are not employed, inert growing media can be employed in hydroculture. Often these media are rock-based, such as expanded clay aggregates.

SUMMARY

An exemplary growing device of the present invention includes a container formed between a first material layer and a second material layer, where the container includes at least a bottom edge along which the first material layer and the second material layer are bonded together along a bond line. In these embodiments the first material layer including a first opening therethrough, and the second material layer including a second opening therethrough. The openings can be cut, stamped, or otherwise defined in the material layers or can be inherent in the material layer, such as the openings between fibers of a fibrous material layer. In various embodiments, the first and second material layers are both part of a single continuous material layer, where a fold demarks the dividing line between the first and second material layers. The growing device can be formed into a sleeve, in some embodiments, with the first material layer formed into a first tube and the second material layer is formed into a second tube disposed within the first tube. In other embodiments the growing device is employed as a sheet.

In various embodiments the first material layer comprises a fibrous and porous material having seeds affixed thereto. In other embodiments the growing device further comprises a cutting, seed, tuber, spore, rootstock, grafted plant, grafted bud, bulb or seedling disposed within the container and between the first material layer and the second material layer. Still other embodiments of the growing device further comprise a seed layer disposed between the first and second layers where the seed layer includes seeds affixed thereto.

In various embodiments a gap is provided between a closest point of the first opening to the bottom of the container and a farthest point of the second opening to the bottom of the container. When the growing device is hung vertically, the gap keeps water from flowing out through the second opening since it is above the highest first opening. In further embodiments, one or more of the bond lines are permanent, recloseable, or resealable. Permanent bond lines can be melted or otherwise compromised in some instances, while recloseable or resealable bond lines allow for reuse of the growing device.

Various embodiments further include a support material. Support materials serve multiple roles in the present disclosure from materials that release water and/or nutrients into the roots of growing plants, to materials that swell when exposed to water that are employed for structural purposes. Such support materials, when constrained in a pouch or pocket can strengthen the growing device and/or cause the growing device to assume a form or shape. Such a closed pouch of sodium acetate or a superabsorbent material can be attached to either the first or the second material layer. In some instances support materials can be used to seal off a portion of the container from another portion thereof to retain moisture in one portion and from escaping from the other portion.

The present invention is also directed to growing systems that comprise a growing device including a plurality of containers formed between a first material layer and a second material layer as otherwise described above. Some of these embodiments further comprise channels formed between the first material layer and the second material layer for delivering water to each container or to other specified areas of the device. Multiple independent channels can deliver nutrient solutions to containers while independently providing just water to other components such as support materials. Channels can be formed by additional strips of material bonded along parallel edges to surfaces of the first and/or second material layers.

In various embodiments, growing systems further comprise electrically conductive paths provided on a surface of the first material layer or the second material layer. These electrically conductive paths can transmit signals, provide power to lights and other components, and allow for heating. In some embodiments, the electrically conductive paths are intended to be heated by application of an external electromagnetic induction field, and for these applications the electrically conductive paths can be discontinuous.

Still further embodiments of the growing system include a chamber enclosing the growing device. The chamber can be used to maintain an overpressure, in some examples. Embodiments with a chamber can further include a ventilation system, as well as systems for providing water, electricity, controls, and so forth.

The present invention is further directed to methods of making growing devices. An exemplary method comprises a step of receiving one or more material layers, where the one layer is a continuous material layer in embodiments in which the only one material layer is used. The exemplary method further comprises a step of configuring the one or more material layers for assembly, then a step of assembling the growing device from the one or more material layers to define containers having openings.

In various embodiments, configuring a continuous material layer for further assembly includes defining openings in the continuous material layer, and folding the continuous material layer to form a first material layer over a second material layer joined at a fold. In embodiments in which two material layers are received, the step of configuring the two material layers for assembly can include aligning the two layers. In further embodiments, configuring the one or more material layers for assembly includes placing a seed layer between the first and second material layers. In other embodiments, configuring the one or more material layers for assembly includes placing seeds on the continuous material layer, or one of the two material layers, at locations where containers will be defined.

Configuring the one or more material layers for further assembly can optionally include forming electrically conductive paths on one or more of the one or more material layers. These electrically conductive paths, in some embodiments, are discontinuous, such as a line of dots, or a series of dashed lines, as they are meant to be heated by electromagnetic induction and are not meant to transmit signals nor power.

In the exemplary method, the step of assembling the growing device from the one or more material layers can include bonding the first material layer to the second material layer to form bond lines that define containers having openings therein. In some of these embodiments, bonding the first material layer to the second material layer to form the bond lines comprises heating the bond lines to melt the respective materials to cause them to fuse together. Heating can be accomplished by an applied external heat source, including sources that produce heating in the materials through ultrasonic energy or friction, but can also be accomplished by applying electricity to conductive paths that are sufficiently resistive, as well as by applying an electromagnetic inductive field to conductive paths, whether or not they are continuous. Assembling the growing device can also comprise bonding the first material layer to the second material layer to form bond lines by non-thermal techniques including closing recloseable or resealable types of attachments such as those that employ magnets, Velcro, zippers and the like.

While seeds or other plant material can be placed between the material layers during assembly of the growing device, or placed on a material layer during the step of configuring the one or more material layers for assembly, in some embodiments the growing device is fully assembled, and then in an option step seeds or other plant materials are placed in the containers of the completed growing device such as by being inserted through an opening into each container.

BRIEF DESCRIPTION OF THE DRAWINGS

FIGS. 12 and 13 show front views of a growing system enclosing a sleeve within a chamber, according to various embodiments of the invention, where FIG. 13 includes plants growing from the sleeve while FIG. 12 shows the same without the plants.

DETAILED DESCRIPTION OF THE INVENTION

The present invention is directed to plant growing systems comprising a double walled construction. In some embodiments the double walled construction is formed into a cylindrical shape such that the double wall results in a tube within a tube. This configuration is commonly referred to herein as a sleeve. In other examples, the double walled construction is employed as a sheet. One wall of the sheet, or the inner wall of the sleeve, is termed the "rooting layer" while the other wall of the sheet, or outer wall of the sleeve, is termed the "sprouting layer." In both configurations the space between the sprouting layer and the rooting layer defines an interior space, referred to as the "container space," where the container space is divided into a plurality of containers each configured for growing plants and/or fungi, for example. In sleeve configurations the space defined within the sprouting layer defines an interior volume referred to as a "rooting channel" that is intended to retain plant roots and flowing water. In sheet embodiments a third layer, termed a "water retaining layer," optionally can be added such that the rooting layer is disposed between the water retaining layer and the sprouting layer. In these embodiments, the space between the rooting and water retaining layers is also called the rooting channel. Both sheet and sleeve embodiments can further include a "seed layer" disposed between the rooting layer and the sprouting layer. The seed layer can serve to retain seeds or spores as well as to wick water.

Each container formed from the container space includes at least two openings. A first opening disposed in the sprouting layer allows for a plant stalk or upper portion of the plant to emerge from the container. One or more second openings disposed in the rooting layer allows for roots to grow out of the container and for water to enter the container from the rooting channel. Growing systems may be hung vertically in various embodiments, placed horizontally, or employed in a microgravity environment. Growing devices described herein can be easily separated into individual containers, such as by cutting with a utility knife. Thus, individual plants can be placed into an extended growing system for future harvest as they still contain the root system. This allows the grower the ability to ship or sell individual living plants to the end user; the end user can then transplant or harvest the living plant still in its container.

Figure 1A:
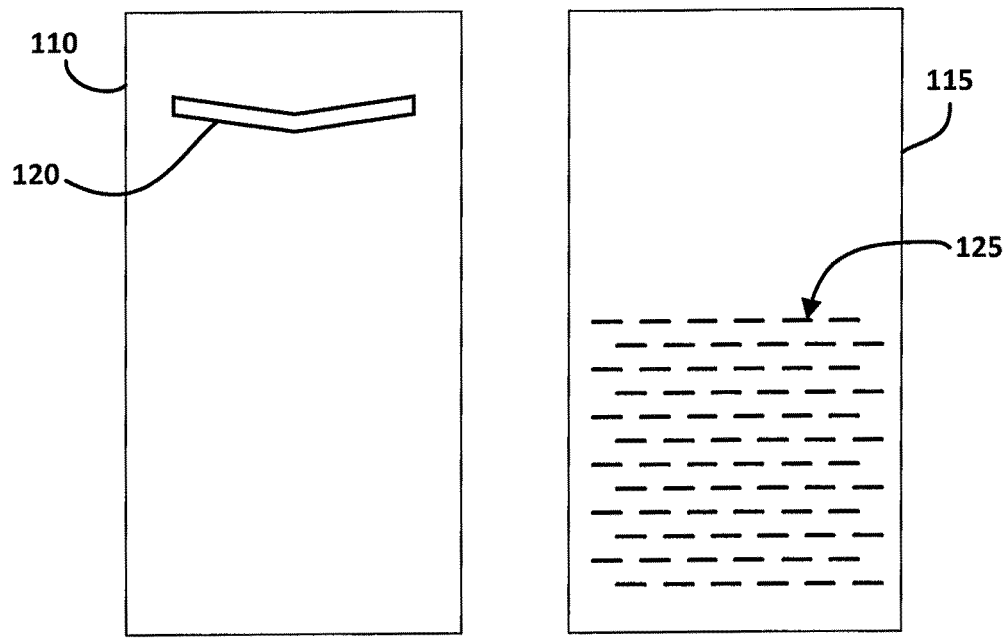
FIGS. 1A and 1B illustrate two material layers having first and second openings, respectively, according to various embodiments of the invention.
Figure 1B:
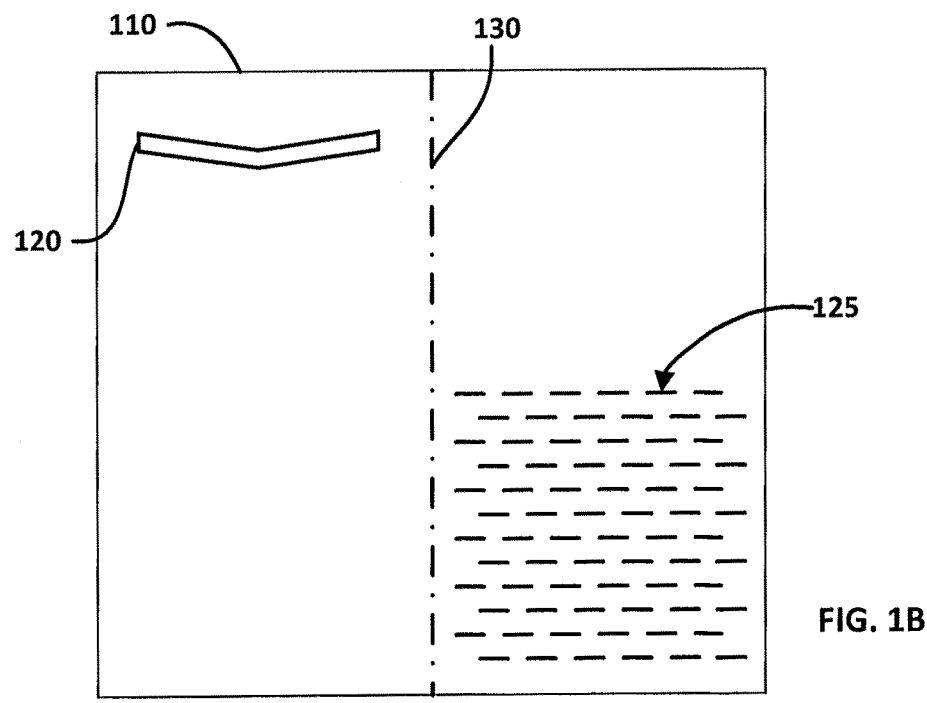

FIG. 1A illustrates an exemplary sprouting layer 110 and rooting layer 115, both laid flat. In sleeve embodiments, the left and right edges of the rooting layer 115 are joined together to form a hollow inner tube; the left and right edges of the sprouting layer 110 are also joined to form an outer tube that is disposed around the inner tube of the rooting layer 115. FIG. 1B illustrates another example where both the sprouting layer 110 and rooting layer 115 are formed from a single continuous material layer, where a fold 130 demarks the dividing line between the two. When folded along fold 130, an edge of each layer 110, 115 lines up parallel to the fold 130; the two edges distal from the fold 130 can then optionally be joined together, and then optionally joined to the fold 130 to form a sleeve having inner and outer tubes that are also joined along a longitudinal line (the fold 130) that is parallel to a longitudinal axis defined by the sleeve.

The sprouting layer 110 can comprise a single layered or a multi-layered flexible material, where the sprouting layer 110 can be water-resistant or waterproof, and opaque. Likewise, the rooting layer 115 can also comprise a single layered or a multi-layered flexible material, where the rooting layer 115 can also be water-resistant or waterproof and preferably contributes strength. Opacity is not a requirement for the rooting layer 115. In a multi-layered material, one laminate can provide the opacity while another laminate provides water resistance or water proofing, for example. Examples of suitable materials for both layers 110, 115 include high-density polyethylene, low-density polyethylene, polypropylene, natural fibers such as bamboo, paper, jute, and some bioplastics. A waterproof treatment may be applied to either layer 110, 115, such as when the material comprises a natural fiber.

Each layer 110, 115 includes one or more openings disposed therethrough. Opening 120 in the sprouting layer 110 allows a sprouting plant to emerge from its container, while one or more openings 125 in the rooting layer 115 allows the plant's roots to grow therethrough and for water to enter the container. The openings 120, 125 can take various forms, in the illustrated example the opening 120 is a wide, V-shaped cut-out while the openings 125 comprise an array of short horizontal slits. The opening 120 is not limited to a single opening, and both openings 120, 125 can comprise numerous shapes and sizes. In some embodiments, the shape of the opening 120 is sized to allow such items as seeds, cuttings, rootstock, spores, tubers, plugs, or seedlings to be placed into the container through the opening 120. The size and shape of openings 125 can be configured to act as an anchoring point for the initial stages of root growth. In some embodiments, the rooting layer 115 includes an interconnected network of pores, for example, that serves as the openings 125. As such, openings 125 are not necessarily defined in the rooting layer 115 by cutting or stamping, rather the openings can be inherent to the material. Fabrics, likewise, can provide spaces between fibers to serve as openings 125 through which roots can pass.

For embodiments meant to be suspended vertically, the opening 120 can be disposed above the openings 125 when so suspended. In relative terms, if the bottom of a container is taken as a reference line, a closest point of the opening 120 to the reference is further from the reference than the farthest point of any of the openings 125. Having openings 125 disposed below opening 120 allows water to flow into the container through the openings 125 and not flow out through the opening 120. The separation between the closest point of the opening 120 to the bottom of the container and the farthest point of any of the openings 125 to the bottom of the container is referred to herein as a gap between the openings 120, 125.

Figure 2:
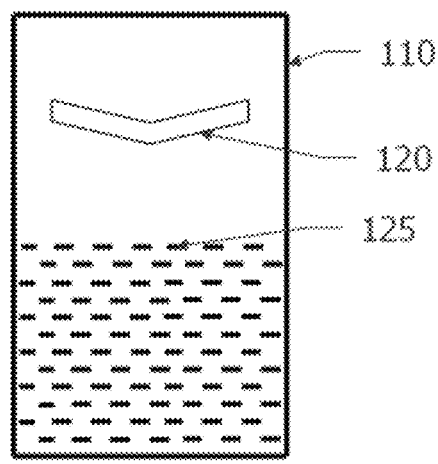
FIG. 2 illustrates an overlay of the openings illustrated in FIGS. 1A and 1B, according to various embodiments of the invention.
Figure 3:
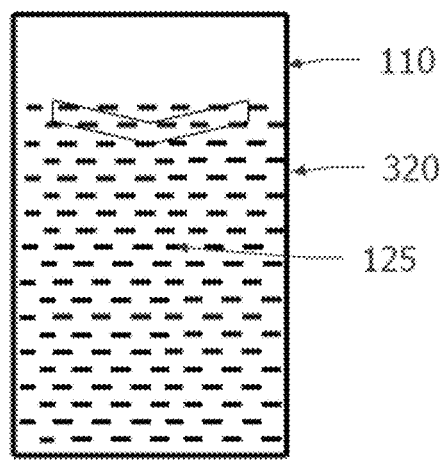
FIG. 3 illustrates an overlay of openings similar to those illustrated in FIGS. 1A and 1B, according to still further embodiments of the invention.

FIG. 2 illustrates an overlay of the openings 120, 125 that are shown in FIGS. 1A and 1B. Adjustments to the gap between the openings 120, 125, as well as adjustments to the position of the first 120 opening relative to the bottom of the container 320 can change the moisture retention properties of the container. FIG. 3 illustrates another overlay of openings similar to those illustrated in FIGS. 1A and 1B. In this example, the position of the first opening 120 relative to the second openings 125 is such that there is essentially no gap. This arrangement can be used, for example, for embodiments that are set horizontally or on a shallow incline.

Figure 4:
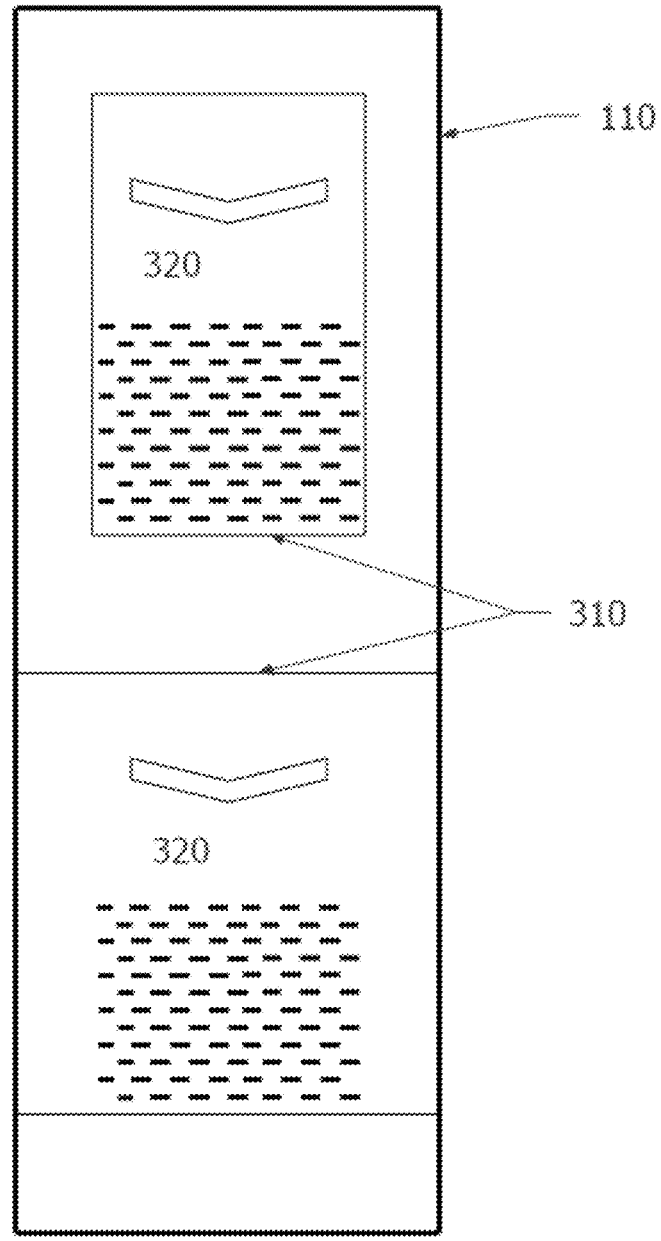
FIG. 4 illustrates an overlay of the openings for a growing device having multiple containers, according to various embodiments of the invention.

FIG. 4 illustrates an overlay of the openings 120, 125 for an embodiment having multiple containers 320 arranged in a column. Containers 320 are defined by one or more bond lines 310 that join the sprouting layer 110 to the rooting layer 115, thereby closing off a portion of the container space and defining at least a bottom side for each container 320. Optionally, additional bond lines 310 can provide sides perpendicular to the bottom side bond line 310 and extending therefrom. The bottom and two perpendicular side bond lines 310 define the container 320 as a pocket with openings 120, 125 disposed above the bottom side and between the two perpendicular sides. In some of these embodiments a fourth side bond line 310 parallel to the bottom side extends between the perpendicular two sides such that the four sides define an enclosed pocket around the openings 120, 125. Each container 320 is intended to hold one or more seeds, seedlings, cuttings, and/or spores, for example. It is noted that while bond lines 310 are shown as straight lines in these illustrations for simplicity, they are not limited to being straight, and curved bond lines 310 may benefit certain applications.

Permanent bond lines 310 can be achieved by welding, such as ultrasonic, thermal, wedge, and chemical welding, as well as pressure bonding, stitching, gluing, taping, or the use of other fasteners, in various embodiments. Bond lines 310 in other embodiments are recloseable or resealable. For example, the bond lines 310 may be achieved by magnets placed in both layers 110, 115, a magnet in one layer 110, 115 and a length of a suitable metal in the other, Velcro, zippers, and Ziplock-type closures, for example. This allows the growing device to be used multiple times. The layers 110, 115 can be conveniently separated for harvesting and reassembled after cleaning for reuse. In embodiments that employ magnets, the magnets may be of a solid strip type, or they may be individual magnets attached to a strip or a pattern of the fabric. Optionally, magnets may be enclosed in pouches allowing for easy installation and removal. In various embodiments, these same resealable or recloseable techniques can be employed along opposing edges of a sheet of containers 320 in order to convert the sheet into a sleeve.

Figure 5:
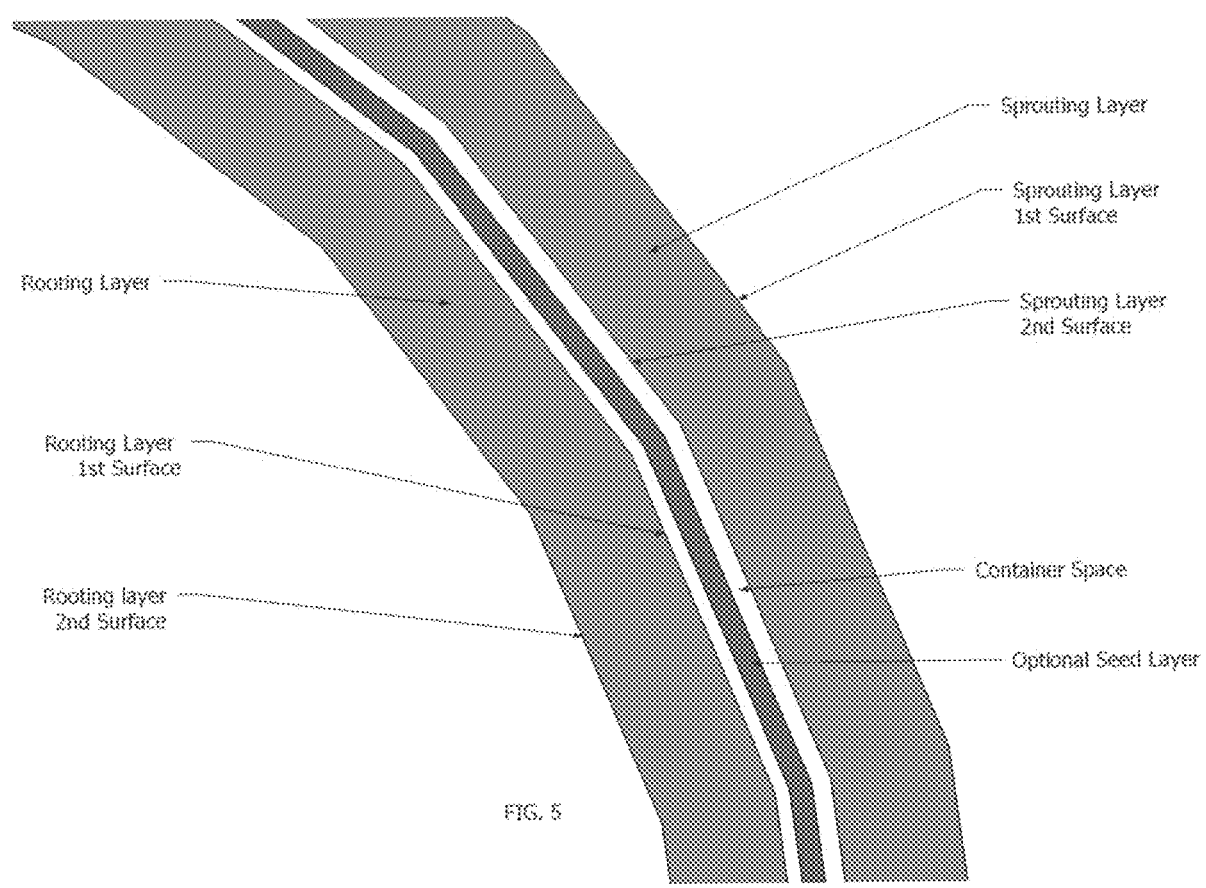
FIG. 5 is a cross-sectional view of a double-wall including a seed layer, according to various embodiments of the invention.

FIG. 5 is a cross-sectional view of an exemplary double-wall. In some embodiments, growing devices of the present invention include seeds disposed within the containers 320 so that the growing device is pre-configured to grow plants from seeds by just adding water. As mentioned above, a seed layer comprising a sheet of a thin fibrous and porous material and sandwiched between layers 110, 115 can provide seeds at the correct positions within each container. FIG. 5 shows, in cross-section, such a seed layer disposed between a sprouting layer 110 and a rooting layer 115. The material used for the seed layer is preferably one that a seedling can easily escape from as it grows. The material of the seed layer, in some embodiments, can also serve to wick moisture directly to the seeds for germination and to provide an initial anchoring point for root growth. In some embodiments, instead of a seed layer, the sprouting layer 110 or rooting layer 115 is made from a thin fibrous and porous material and also serves the function of the seed layer. In embodiments where the sprouting layer 110 is made from a thin fibrous and porous material, the layer 110 can be made water resistant, such as through an applied water repellant, in order to help limit moisture from escaping. In embodiments where the rooting layer 115 is made from a thin fibrous and porous material, the layer 115 can be configured such that the portion of the layer 115 positioned above the opening 120 is made water resistant, such as through an applied water repellant, in order to help limit moisture from escaping.

In some embodiments, seeds can be affixed to the seed layer, or sprouting layer 110, or rooting layer 115, sometimes by using a binding agent. The binding agent can be a water-degradable material that adheres the seeds to the surface of the layer to which they are affixed. By breaking down over time with the addition of water, the binding agent allows the seeds to germinate unimpeded. This agent can include a fibrous material to aid in wicking moisture to the seed. Exemplary binding agents include acrylamide copolymer tackifiers used for hydroseeding.

While in some embodiments seeds or other plant material are placed in containers 320 as the growing device is assembled, in other embodiments seeds or other plant material is added to the containers 320 after assembly, and in further embodiments leave the containers 320 empty. Exemplary plant materials include a cutting, tuber, spore, rootstock, grafted plant/bud, bulb or seedling. For instance, a pellet or plug consisting of seed can be inserted into the container 320. In some embodiments a binding agent can be used to adhere seed or other plant material to one or both of the layers 110, 115. As above, exemplary binding agents include those used for hydroseeding.

Figure 6:
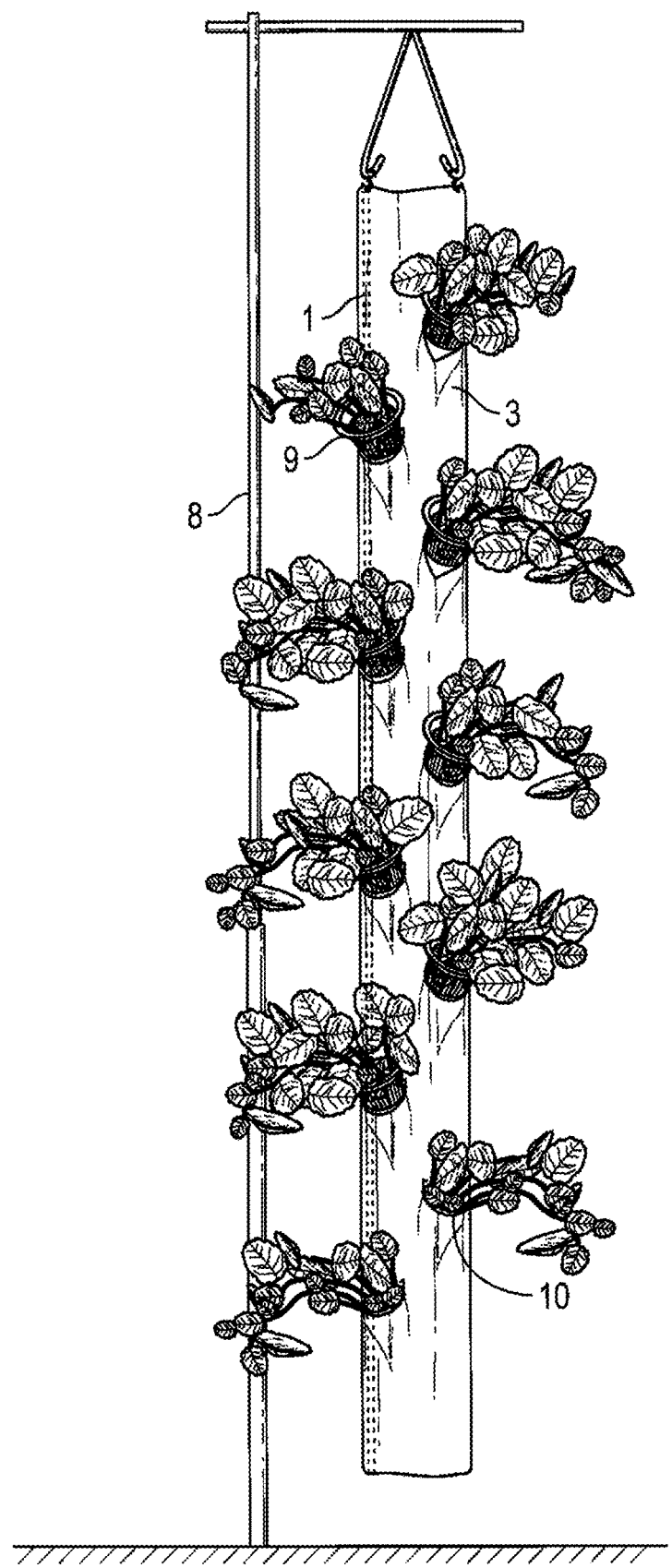
FIG. 6 is a front view of a vertically suspended sleeve including plants growing from multiple containers, according to various embodiments of the invention.

In other embodiments, the plant material can be held in place by the confines of the container 320, such as can be done with a potato cutting. In still other embodiments, the plant material is a bare root stock such as a strawberry plant that may be held in place by the confines of the container 320 or optionally may be held in place by a thread stitched through or around the crown of the plant. This thread can comprise a synthetic or a natural material, in various embodiments. In some embodiments, the plant material may be held in place by a fastener like those used to hang tags on clothing, commonly referred to as "hang tags." These fasteners can be inserted, manually or with a tagging gun, through the crown or root of the plant and then inserted into the material of the sprouting layer 110 or the rooting layer 115. In still further embodiments, the plant material can be enclosed in a net or mesh shaped into a small flower pot that is place into the container 320. These are illustrated in FIG. 6 as pots 9.

Various embodiments of the present invention include either or both of a support material and a plant nutrient disposed within each of the containers 320, and in some instances the support material also provides the nutrient. Suitable materials include water-soluble nutrients, super absorbent polymers, hydrogels, peat pellets, rock wool, coco fiber and clay, for example. The support material can include a slow-release nutrient mixed with one or more of another material such as superabsorbent polymers and hydrogels, sometimes referred to as superporous hydrogels. Support materials and nutrients can also be bonded to any of the several layers such as by the methods applied above to seeds.

Optionally, in some embodiments the support material comprises an oxygenated superabsorbent polymer and/or a hydrogel capable of releasing oxygen into the root zone. The release of oxygen can be later activated by an activating agent, in some embodiments. In further embodiments, the support material can include a pest repellant or preventative.

In addition to integrating insect control with support materials, additional insect controls can be employed. A chemical coating, such as a pesticide or insecticide, can be applied to the entire growing device or to portions thereof, such as either or both of the layers 110, 115, or applied in strips or, in the case of sleeves, as a ring or rings around the growing device. In some embodiments, the insect control is applied as a liquid and coated or sprayed, while in other embodiments the insect control device is a solid material that can be adhered to the growing device. Materials for fabricating the growing device can be received already treated, or insect control materials can be applied during the manufacturing process, or after the growing device has been assembled.

As a further example of a support material, a superabsorbent material, like a hydrogel, can be employed to support a sheet or sleeve in a specific pattern so that the sleeve or sheet will maintain some desired shape. The superabsorbent material can be bonded with bond lines 310 in a space between the sprouting layer 110 and the rooting layer 115, such as between containers 320. As another example, a layer of nonwoven absorbent fabric can be affixed to either layer 110, 115 to form a pocket, and the superabsorbent material can be inserted into the pocket. The pocket optionally is disposed between containers 320. When water is applied to the growing device the superabsorbent material swells, and since the superabsorbent material is confined, the swollen material serves to stiffen the pocket or space defined by bond lines 310. As discussed below, channels can deliver water, or nutrient-enriched water, independently throughout the growing device, such as nutrient-free water to these support materials.

In some embodiments, the superabsorbent material is constrained in this manner into the form of a torus positioned at the top and/or bottom of a sleeve-type device. Other tori can also be placed in multiple locations along the sleeve. Optionally, superabsorbent material in a pouch or bonded space can also serve as a place for nutrients and moisture retention for delivery to roots. In some of these embodiments, the roots of plants may be allowed to grow into the superabsorbent material, such as through further openings in the rooting layer 115. Sodium acetate combined with water is another exemplary material that can be constrained in a sleeve and activated to become hard through the crystallization of the sodium acetate, thereby providing some desired shape to the growing device. Analogously, epoxy resin, thermosetting polymers or polyepoxides can be used to provide shaping.

In sheet embodiments, superabsorbent material can be similarly enclosed in vertical or horizontal shafts between the water retaining and rooting layers. Optionally, the superabsorbent material can be enclosed to form one or more pillars at staggered locations in some sheet configurations to lend stiffness. In other embodiments, the superabsorbent material can be enclosed in the shape of a web with cross members to provide additional support to either sleeve or sheet configurations.

Various sleeve embodiments can include a water-permeable barrier disposed within the rooting channel, while sheet embodiments can comprise the water-permeable barrier between the rooting layer 115 and water retaining layer. Barriers provided herein can serve to provide a shelf, or rooting anchor, for supporting the roots of rooting crops. The barrier can be attached to a surface of the rooting layer 115 that faces away from the sprouting layer 110. In some sleeve embodiments, this barrier comprises a mesh that spans the rooting channel. In sheet embodiments, the mesh can span between the rooting layer 115 and the water retaining layer. Exemplary mesh materials include the type used for produce bags or mosquito netting. Other embodiments employ a barrier which is a solid layer or film of a material, attached like in the mesh example, but with openings or perforations to allow water to pass therethrough.

FIG. 6 shows a vertically suspended sleeve 1 including multiple plant growing containers 3. In this example, the containers 3 are staggered, as shown, but can be arranged in numerous other arrangements. A post or pole 8 with a crossbar at a vertical height greater than the height of the sleeve 1 suspends the sleeve off of the ground, as shown. In various embodiments, strengtheners, stiffeners, tensioners, and similar components can be added to both sheet and sleeve configurations. FIG. 6 also illustrates the optional use of pots 9 for securing plant materials within openings 120. Some containers 3 do not include these pots 9 and are designated as 10 in the illustration.

Figure 7:
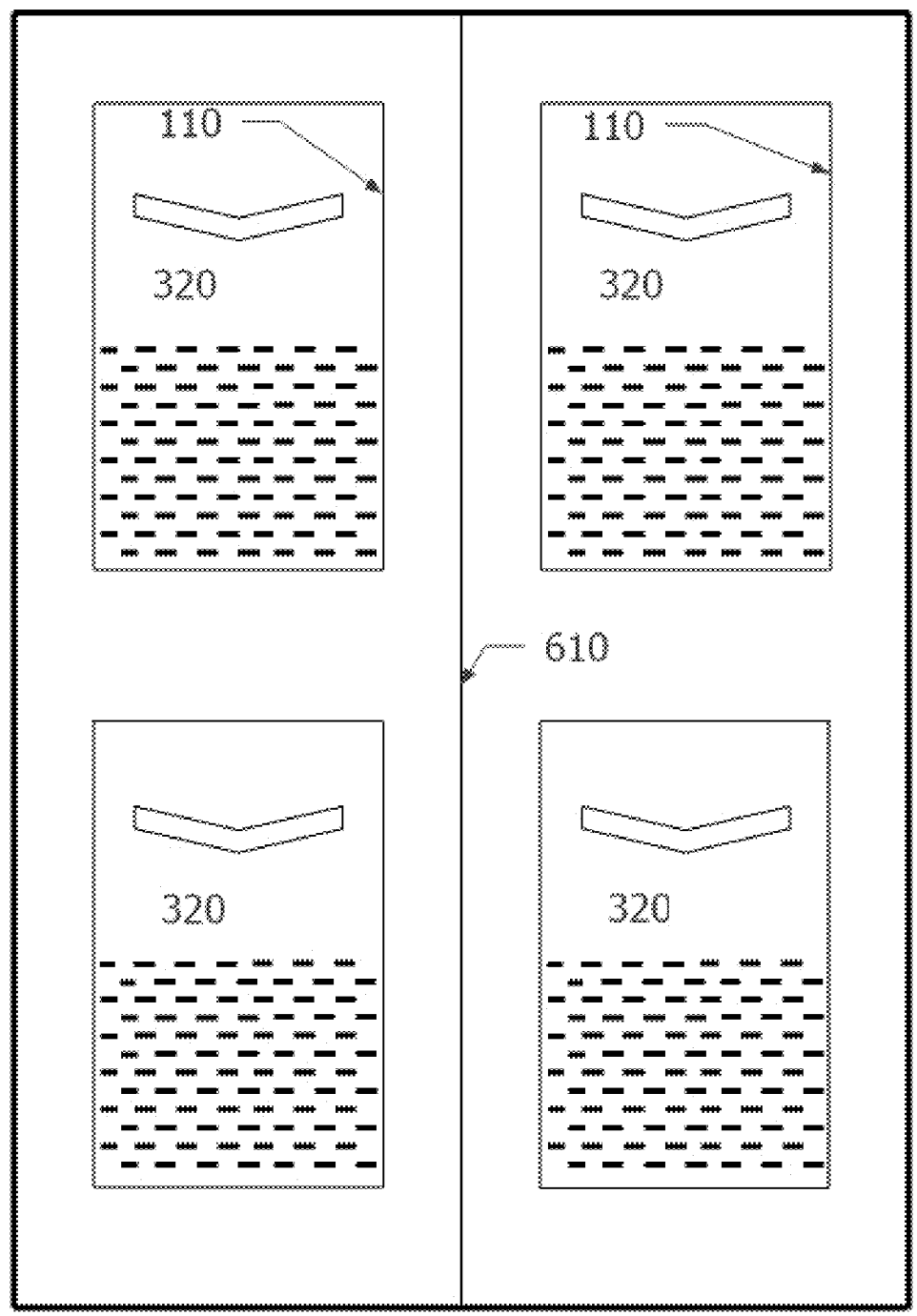
FIG. 7 illustrates an overlay of the openings for a growing device having multiple containers stacked vertically, further showing a vertical bond line between columns of containers, according to various embodiments of the invention.
Figure 8:
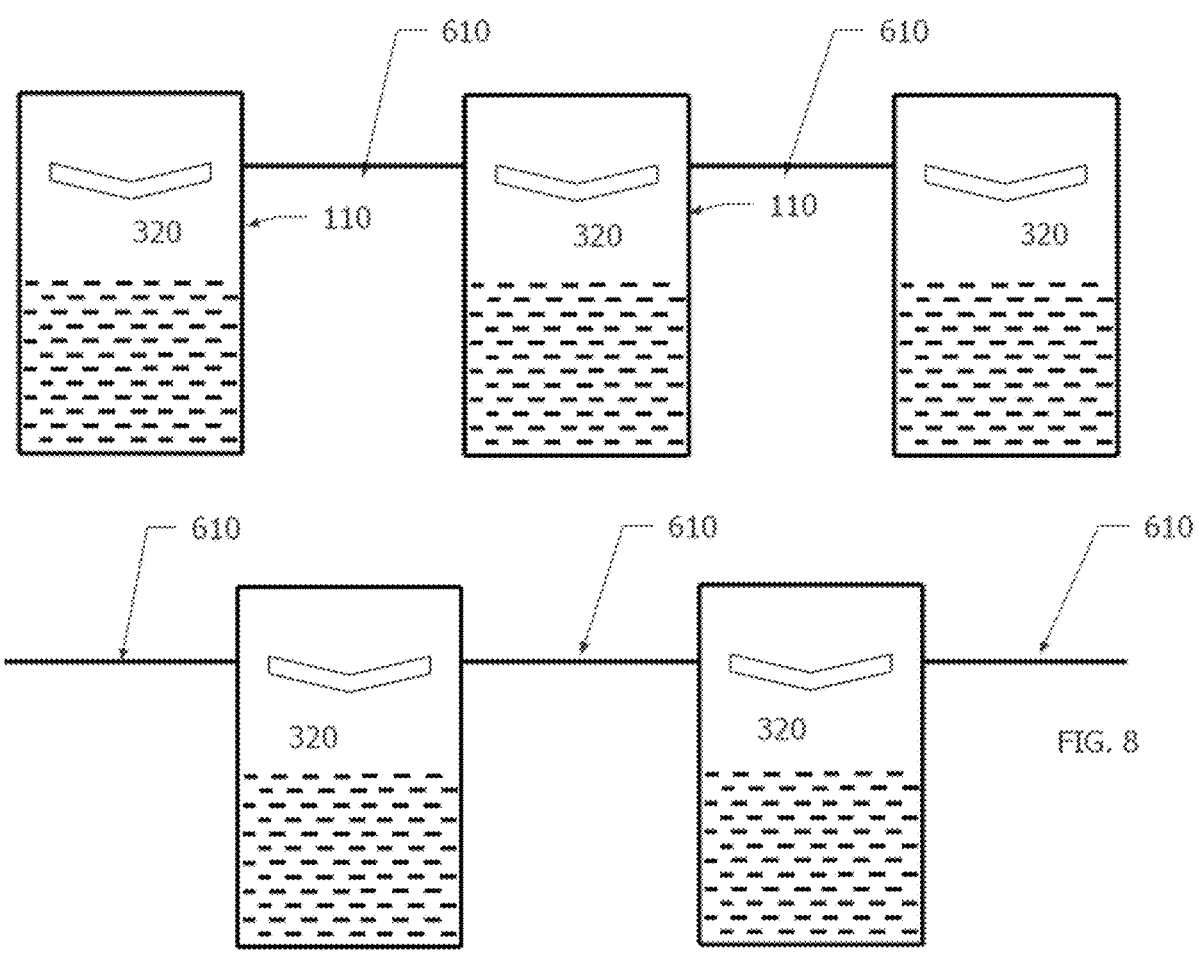
FIG. 8 illustrates an overlay of the openings for a growing device having multiple containers stacked in a staggered configuration, further showing horizontal bond lines, according to various embodiments of the invention.

FIG. 7 illustrates an overlay of the openings for a growing device having multiple containers 320 stacked vertically, and further showing a vertical bond line 610 between columns of containers 320. Likewise, FIG. 8 illustrates an overlay of the openings for a growing device having multiple containers 320 stacked in a staggered configuration, and further showing horizontal bond lines 610. Bond lines 610 may bond the sprouting layer 110 to the rooting layer 115 or the rooting layer 115 to the water retaining layer, or may join all three layers. These bond lines 610 add divisions between containers 320 and can also be used to form a system of channels.

Such a system of channels can be formed between the sprouting layer 110 and the rooting layer 115 with bond lines 310, 610, or can be formed between a third layer affixed to either layer 110 or 115, for the delivery of air or liquid to specific points on the growing device. A third layer, in some instances, can be a strip of the same material as either layer 110, 115 and bonded to the layer 110, 115 along two parallel edges of the strip to form an enclosed space running in the direction of the long axis of the strip. Independent delivery systems to the individual containers 320 can be formed from independent systems of channels in order to deliver, for example, air, water, and nutrients independently.

Channel systems can also contain valves at specified points. These valves can, in some embodiments, be constructed within the layers 110, 115 by cutting a flap into layers 115 or seed layer; this flap, when sandwiched between the two layers 110, 115 or between layer 115 and the water retaining layer acts as a one-way-valve. In some embodiments, the channels and valves work like a vascular system to provide water, or water and nutrients, to areas of the device while preventing backflow.

Figure 9A:
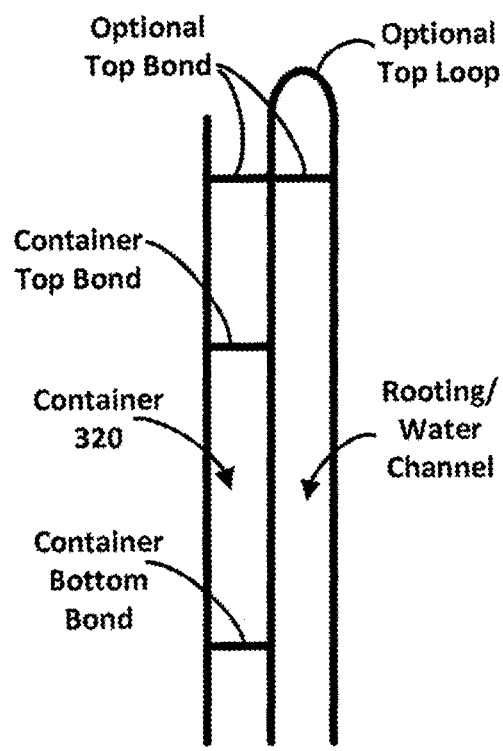
FIGS. 9A and 9B show cross-sectional views of sheet and sleeve-type growing devices, respectively, according to various embodiments of the invention.
Figure 9B:
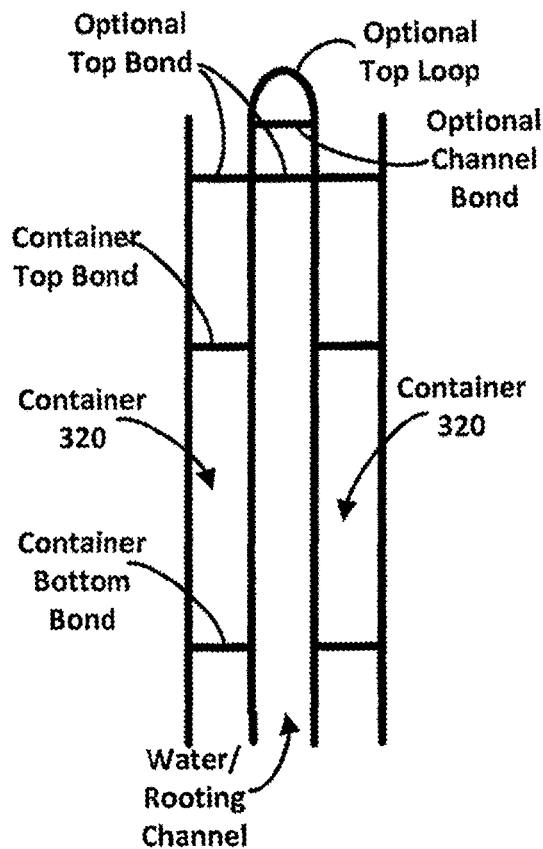

FIGS. 9A and 9B show, respectively, cross-sectional views of sheet and sleeve-type growing devices. In the single-sided sheet configuration of FIG. 9A, one side is for growing plants while the other side is for retaining water and roots, forming a rooting channel. This could be used against a wall where only one side of the sheet is needed for growing plants, for example. It should be appreciated that the water retaining layer is optional in as much as a sheet-type growing device without a water retaining layer can be installed proximate to an external flat surface, such as a glass window, to achieve the same effect.

FIG. 9B illustrates that added bond lines, shown as a top bond and a channel bond, can be used to form a channel for delivery of water into the growing device. FIG. 9B also can be viewed as representing a further sheet-type embodiment in which the water retaining layer is replaced by another double wall comprising a second rooting layer 115 and a second sprouting layer 110, such that the growing device comprises containers 320 on both sides.

Figure 10:
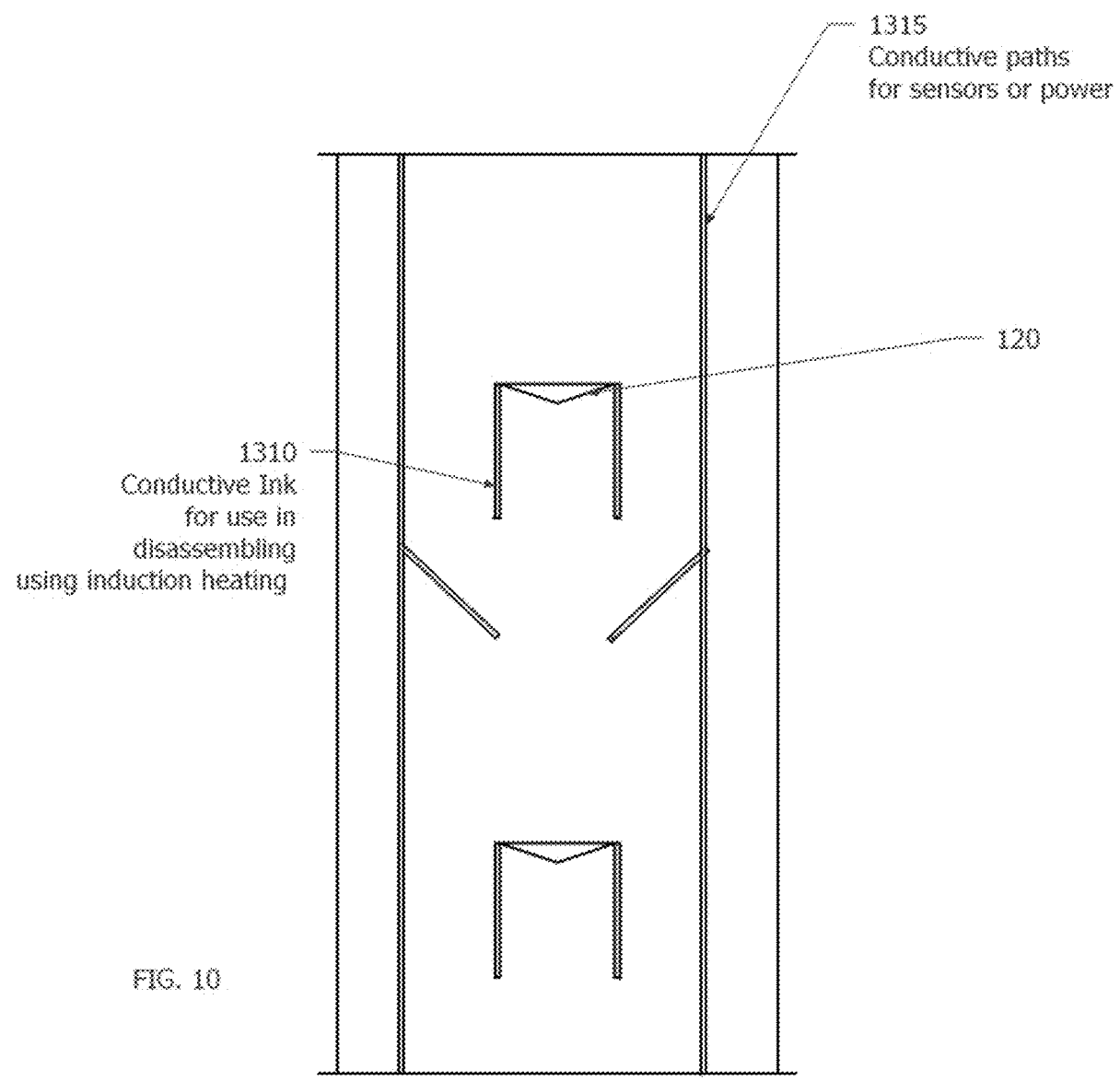
FIG. 10 shows a sprouting layer including conductive paths, according to various embodiments of the invention.

As shown in FIG. 10, various embodiments can include electrically conductive paths to serve multiple purposes. As an example, conductive paths 1315 can transmit electrical signals to and from sensors (not shown) and provide power to lights (not shown) and other electrical components. Such conductive paths can also be heated by way of an applied electromagnetic induction field or through resistive heating to warm the containers 320. Other conductive paths 1310 can be heated to the point that the material of the layers 110, 115 melts, or the integrity thereof is at least compromised, in order to disassemble the growing device for harvesting. In some embodiments, such conductive paths 1310, 1315 are provided on one or more layers 110, 115 of the growing device. In some embodiments, conductive paths 1310, 1315 are provided by painting or printing conductive ink on a layer 110, 115.

As a specific example, in embodiments where root crops are grown, conductive paths 1310 can be arranged along the edges of the container nearest to the roots. The conductive paths 1310 may also be spots and not interconnected. For example, in some embodiments, this would present as lines ranging in size from a few millimeters to multiple centimeters. Optionally, another way to create bond lines 310 is with an electrically conductive adhesive, ink, or paint, where the bond lines 310 become conductive paths 1310. Such bond lines 310 can be heated to a point that the respective layers 110, 115 can be joined, as well as heated to the point that the layers 110, 115 melt, or are at least compromised.

Figure 11:
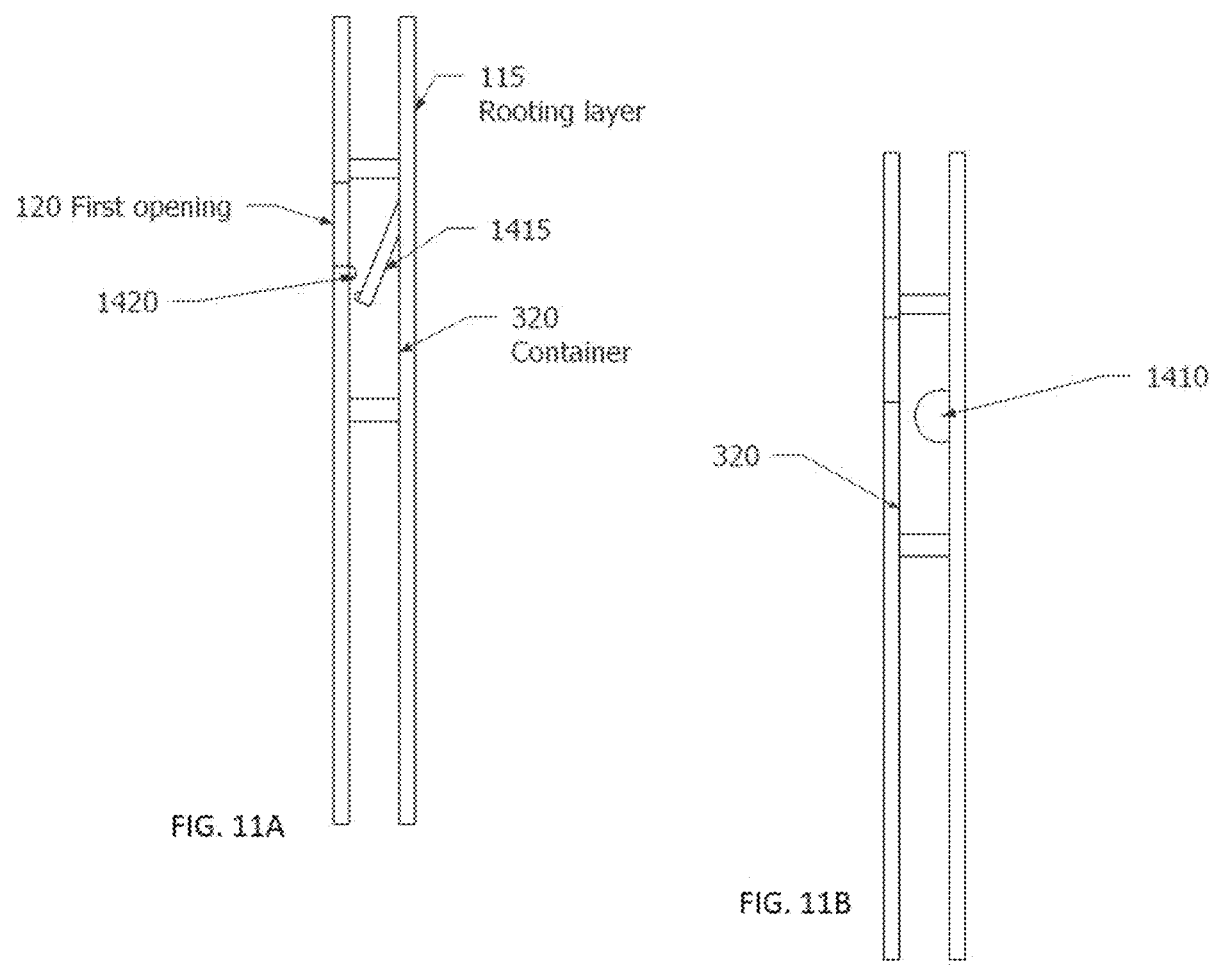
FIGS. 11A and 11B are cross-sectional views of a growing device including within their containers, respectively, a water retaining skirt and a water retaining brim, according to various embodiments of the invention.

FIG. 11A is cross-sectional view of a growing device including, within the containers 320, a water retaining skirt 1415, while FIG. 11B is cross-sectional view of a growing device including, within the containers 320, a water retaining brim 1410. The skirt 1415 or brim 1410 is disposed proximate to the opening 120 and is intended to at least partially seal the opening 120. The skirt 1415 or brim 1410, in some embodiments, can be activated in order to at least partially seal the opening 120 when needed, such as after a planted has sprouted and emerged through the opening 120, in order to better retain moisture thereafter.

The brim 1410 or skirt 1415 can consist of a single layer or multiple layers of material, for instance a first layer of a textured fabric, a second moisture barrier layer, a third layer comprising a hydrogel or superabsorbent material and an optional fourth layer consisting of a degradable moisture proof material which will degrade with the addition of water or an activating agent. When activated, such as with water, the brim 1410 swells and pinches against the sprouting layer 110, securing the plant material against the sprouting layer 110 and closing off the container 320 within the gap between openings 120, 125. Likewise, water can be used to activate the skirt 1415 to stiffen and extend across the container space to achieve the same effect.

The skirt 1415 or brim 1410 may be shaped to better fit to the form of the plant material. These can be forked, for example, to go around a sprout, or can be shaped with multiple striations in some embodiments. The brim 1410 or skirt 1415 can optionally include a lip, the sprouting layer 110 can include a lip 1420 to engage with the brim 1410 or skirt 1415, or the lip thereof. For example, the skirt 1415 can be a semi-porous pouch of hydrogel or superabsorbent material with an exterior of a nonwoven fabric through which the roots can grow into the rooting channel. The skirt 1415, when activated by water, encircles the stem of the plant preventing moisture from escaping the growing device through opening 120 by creating an airtight or semi air tight seal. In some embodiments, channels described above can deliver air or liquid to the skirt 1415 or brim 1410 as well as to other supporting structures within the growing device.

Optionally, such a skirt 1415 can be bonded instead to the sprouting layer 110 to completely cover the opening 120. In these embodiments the rooting layer 115 may be unnecessary, the pouch may be bonded on all edges to the sprouting layer 110 creating a sleeve with a barrier on all openings. This complete seal may be useful in microgravity environments where controlling escaping moisture is important. This complete seal allows for the use of negative and positive pressure within the sleeve.

Further embodiments include an identification system for identifying the growing device, the containers, or both. For instance, barcodes, QR codes, RFID tags, or other means of identification can be added to growing devices and/or to individual containers to identify all of the plants from a single device or to identify each individual plant. This can provide traceability of plants both for production purposes and to aid in identifying the source of a food safety issue. In some embodiments, an identifier is positioned near a first opening 120. In other embodiments an identifier is positioned at periodic intervals, such as every foot. Optionally in other embodiments the identification may be encoded on a magnetic strip.

Figures 12, 13:
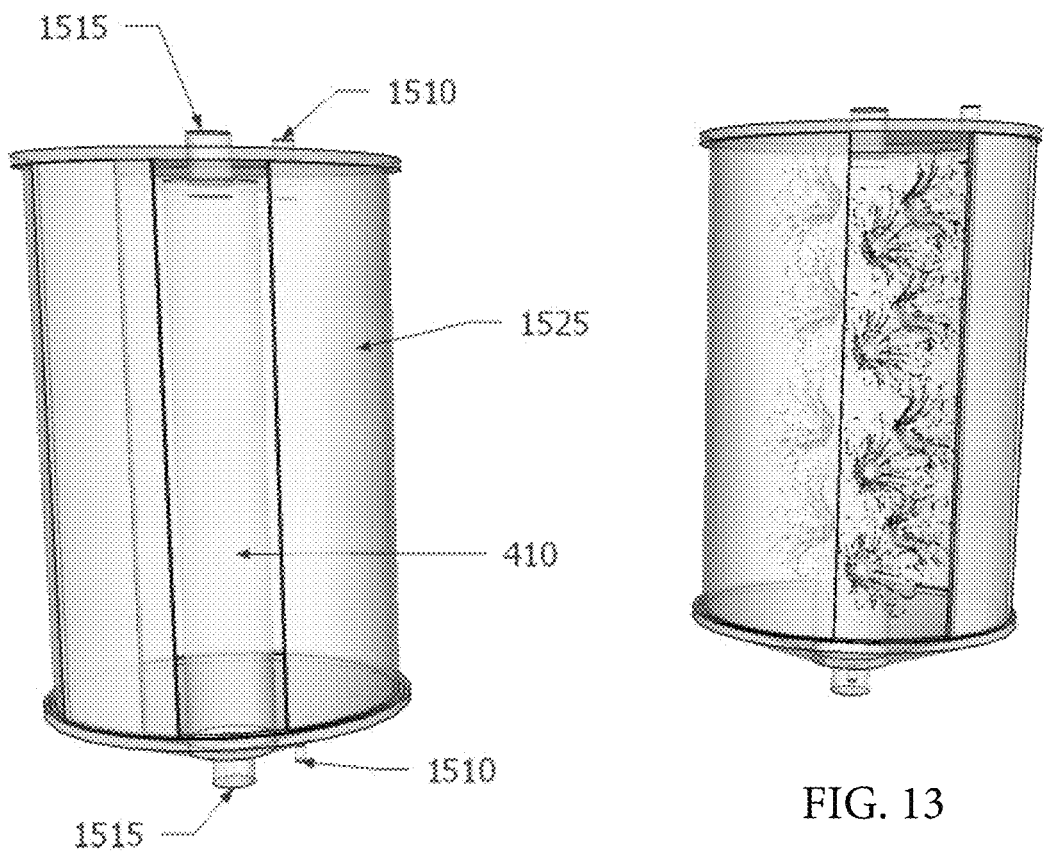
Figure 14:
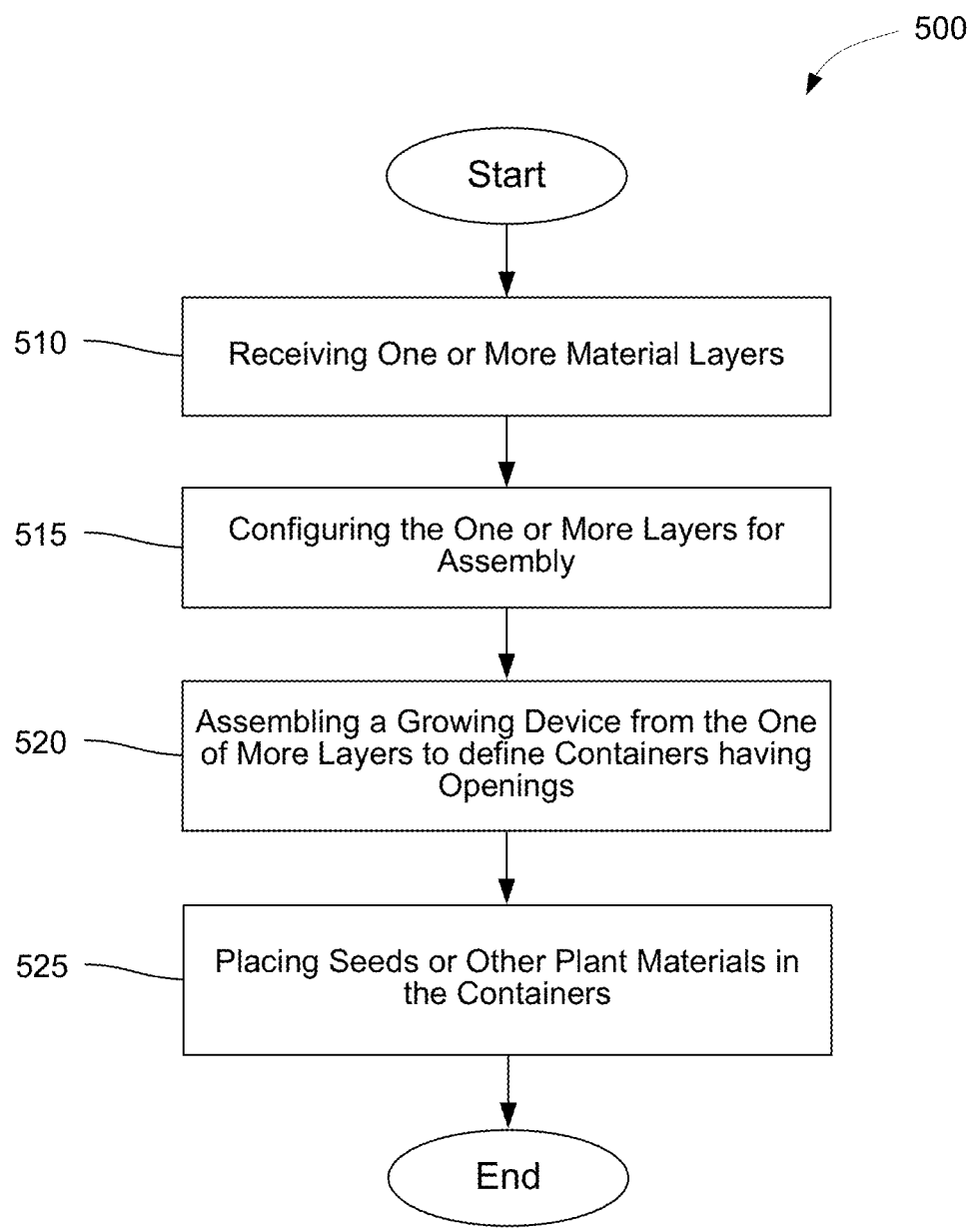
FIG. 14 is a flowchart representation of an exemplary method of producing a growing system, according to various embodiments of the invention.

FIGS. 12 and 13 illustrate an exemplary growing system of the present invention including a chamber 1525 enclosing a sleeve 410. FIG. 12 shows the growing system without plants in while FIG. 13 shows the same with plants. The chamber 1525 includes a housing having liquid delivery ports 1515 and ventilation ports 1510 disposed therethrough. The housing of the chamber 1525 can be either transparent or opaque. Suitable materials for the housing include Zyton® 500 and Frontline® 500 which both provide lightweight and impermeable characteristics. The chamber 1525 may contain a ventilation system, such as a fan disposed within the chamber 1525 or disposed external thereto, in fluid communication with the ventilation ports 1510 for circulating, supplying, or reclaiming gasses. Optionally, in various embodiments, the shape of the chamber 1525 is maintained by using carbon rods and or a rigid plastic on the exterior or within channels of the housing material. Lights, such as LEDs, can optionally be disposed on the inside of the chamber 1525, in some embodiments.

In some embodiments, the top of the rooting channel of the sleeve 410 is in fluid communication with one liquid delivery port 1515 while the bottom of the rooting channel of the sleeve 410 is in fluid communication with the other liquid delivery port 1515. The liquid delivery ports 1515 allow water, with or without nutrients, to flow through the growing device. The liquid delivery ports 1515 can also serve a structural purpose as attachment points at which the chamber 1525 can be secured in place. As illustrated, some embodiments of the housing comprise a door to allow access to the interior of the chamber 1525. In some instances, the door may slide open and/or the housing can rotate. Some embodiments of the housing include an open portion that is closed by a stationary section, in the manner of a darkroom door. In other embodiments, the door is attached with airtight zippers.

Optionally, in some configurations the chamber 1525 maintains a slightly higher air pressure than that within the sleeve 410. The higher pressure of the chamber 1525 helps prevent excess moisture from escaping from the rooting channel of the sleeve 410. This overpressure may be provided by gas exchange into the chamber 1525. Optionally, this pressure can be applied by mechanically decreasing the volume of the chamber 1525. In various embodiments, a ventilation system connected to the ventilation ports 1510 provides a dual loop system where $CO_2$ rich gas is circulated through the chamber 1525 at a slightly higher pressure than oxygen rich gas that is circulated through the rooting channel. Each loop in the ventilation system, in these embodiments, has means for adjusting the gas composition therein.

FIG. 15 is a flowchart representation of an exemplary method 500 of producing a growing device. Method 500 includes a step 510 of receiving one or more material layers, a step 515 of configuring the one or more material layers for further assembly, and a step 520 of assembling the growing device to define containers having openings therein. The method 500 optionally can comprise a step 525 of placing seeds or other plant material in the containers that have been defined.

The step 510 comprises receiving one or more material layers, such as the materials described above as suitable for layers 110 and 115. In some instances one continuous material layer is used for both layers 110 and 115 and either cut to form the two separate layers 110, 115 or is folded to form the two layers 110, 115 joined along one common edge. The received one or more material layers can be pretreated with a pesticide, in some embodiments.

The step 515 comprises configuring the one or more material layers for further assembly. This can include, in various embodiments, treating all or parts of the one or more material layers with a pesticide. The step 515 can also include defining openings in the layers by cutting or stamping. In some instances step 515 includes defining electrically conductive paths on the one or more material layers, such as by a printing technique. In still further embodiments step 515 includes forming enclosed channels on the one or more layers. This can be achieved, for example, by bonding strips of a waterproof material to one or the other of the two material layers. Step 515 can also include attaching one or more pouches containing a superabsorbent material to one or both material layers.

The step 520 comprises assembling the growing device. Optionally, this can include folding a single continuous sheet. This step includes bonding the material layers together to form bond lines that are either permanent or temporary. The bond lines then define containers 320 having openings therein. In various embodiments, bonding the material layers together to form bond lines includes briefly applying electricity to conductive paths to melt adjacent material layers along those conductive paths. Step 520 can also comprise forming the two material layers into a sleeve by bonding opposite edges of the material layers together. Step 520 can optionally include placing a seed layer between the material layers, or placing seeds, tubers, spores, cuttings or other plant material on a material layer, before forming bond lines.

An optional step 525 comprises placing plant materials into the containers 320 that have been defined. Plant materials such as cuttings, tubers, spores, rootstock, grafted plants/buds, bulbs or seedlings can be inserted through an opening into each container 320. In some of these embodiments, as well as embodiments where plant materials are added in step 520, the plant material is held in place by a fastener.

The embodiments discussed herein are illustrative of the present invention. As these embodiments are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

The use of the term "means" within a claim of this application is intended to invoke 112(f) only as to the limitation to which the term attaches and not to the whole claim, while the absence of the term "means" from any claim should be understood as excluding that claim from being interpreted under 112(f). As used in the claims of this application, "configured to" and "configured for" are not intended to invoke 112(f).

The invention claimed is:

1. A growing device comprising:
a container formed between a first material layer and a second material layer, the container including at least a bottom edge along which the first material layer and the second material layer are bonded together along a bond line, the container defining a vertical axis perpendicular to the bottom edge,
the first material layer including a first opening therethrough, wherein a first span of the first material layer defined between the bottom edge and the first opening does not include any openings, and
the second material layer including a second opening therethrough, wherein a second span of the second material layer is defined between the bottom edge and a top of the second opening, and a remainder of the second material layer not within the second span does not include any openings, and wherein the first span is greater than the second span.

2. The growing device of claim 1 wherein the first material layer comprises a fibrous and porous material having seeds affixed thereto.

3. The growing device of claim 1 further comprising a cutting, seed, tuber, spore, rootstock, grafted plant, grafted bud, bulb or seedling disposed within the container and between the first material layer and the second material layer.

4. The growing device of claim 1 wherein the first and second material layers are both part of a single continuous material layer, where a fold demarks a dividing line between the first and second material layers.

5. The growing device of claim 1 further comprising a seed layer disposed between the first and second layers and including seeds affixed thereto.

6. The growing device of claim 1 wherein the first material layer is formed into a first tube and the second material layer is formed into a second tube disposed within the first tube.

7. The growing device of claim 1 wherein the bond line is reclosable.

8. The growing device of claim 1 wherein the container includes a support material.

9. A growing system comprising:
a growing device including a plurality of containers formed between a first material layer and a second material layer, each container including at least a bottom edge along which the first material layer and the second material layer are bonded together along a bond line, each container defining a vertical axis perpendicular to its bottom edge,
the first material layer including a first opening therethrough within each container, wherein, for each container, a first span of the first material layer defined between the bottom edge and the first opening of that container does not include any openings, and
the second material layer including a second opening therethrough within each container, wherein, for each container, a second span of the second material layer is defined between the bottom edge and a top of the second opening of that container, and a remainder of the second material layer not within the second span does not include any openings, and wherein the first span is greater than the second span.

10. The growing system of claim 9 further comprising channels formed between the first material layer and the second material layer for delivering water to each container through each container's second opening.

11. The growing system of claim 9 further comprising electrically conductive paths provided on a surface of the first material layer.

12. The growing system of claim 11 wherein the electrically conductive paths are discontinuous.

13. The growing system of claim 9, each container including a closed pouch of a superabsorbent material attached to either the first or the second material layer.

14. The growing system of claim 9 further comprising a chamber enclosing the growing device.

15. A method comprising:
receiving a continuous material layer;
configuring the continuous material layer for further assembly including by
defining openings in the continuous material layer, and
folding the continuous material layer to form a first material layer over a second material layer joined at a fold; and
assembling the growing device by bonding the first material layer to the second material layer to form bond lines that define containers having openings therein, each container having a bottom edge and defining a vertical axis perpendicular to the bottom edge, wherein, for each container, a first span of the first material layer defined between the bottom edge and the first opening of that container does not include any openings, and wherein, for each container, a second span of the second material layer is defined between the bottom edge and a top of the second opening of that container, and a remainder of the second material layer not within the second span does not include any openings, and wherein the first span is greater than the second span.

16. The method of claim 15 wherein configuring the continuous material layer for further assembly includes placing a seed layer between the first and second material layers.

17. The method of claim 15 wherein configuring the continuous material layer for further assembly includes forming electrically conductive paths on the continuous material layer.

18. The method of claim 17 wherein bonding the first material layer to the second material layer to form bond lines includes heating the conductive paths.

19. The method of claim 15 further comprising placing plant material into each container.

* * * * *